(No Model.)
P. H. DENCER.
HOSE COUPLING.
No. 499,100. Patented June 6, 1893.
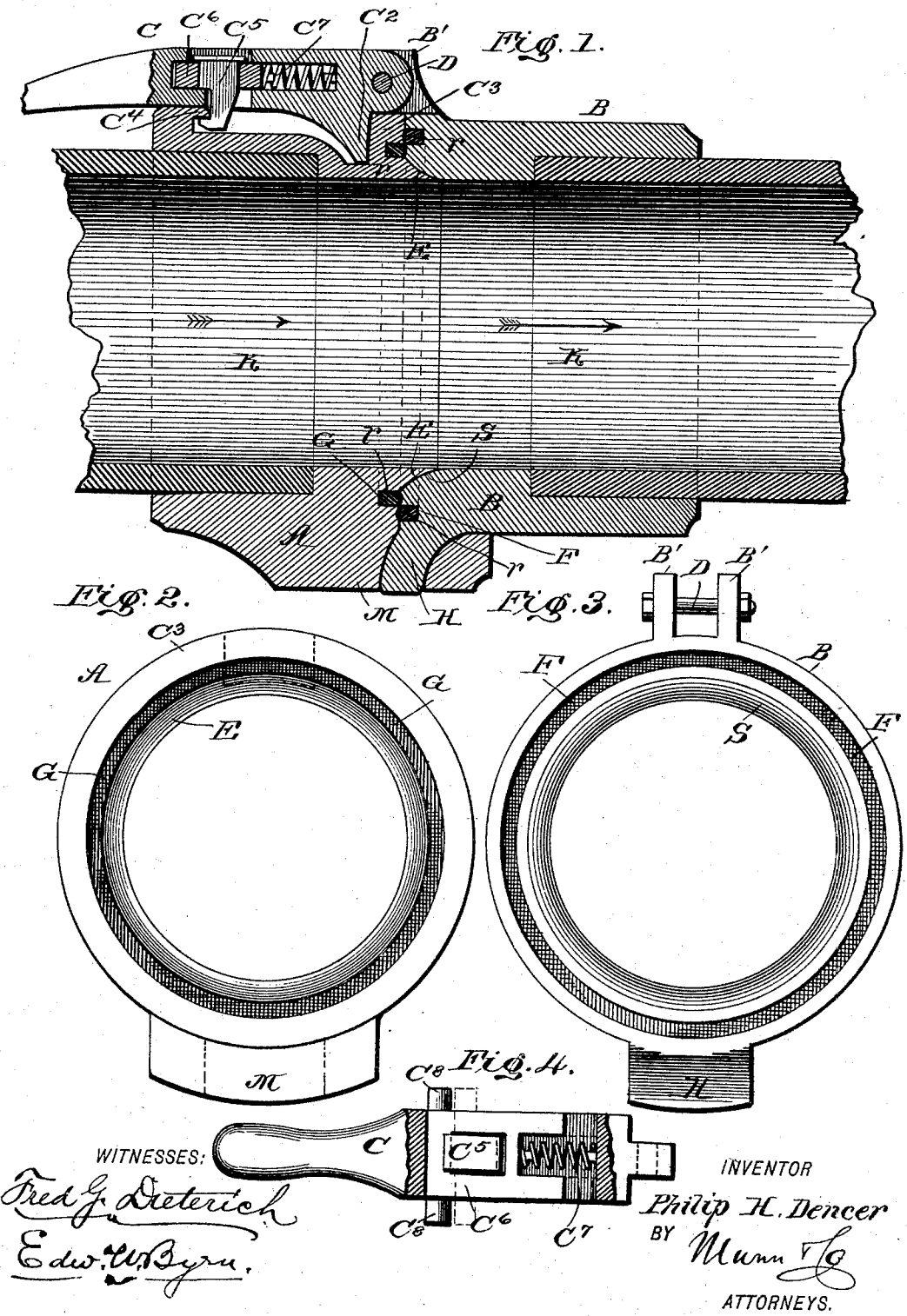
WITNESSES:
Fred G. Dieterich
Edw. W. Byrn.
INVENTOR
Philip H. Dencer
BY Munn & Co
ATTORNEYS.

UNITED STATES PATENT OFFICE.

PHILIP H. DENCER, OF SPRAGUE, WASHINGTON.

HOSE-COUPLING.

SPECIFICATION forming part of Letters Patent No. 499,100, dated June 6, 1893.

Application filed January 23, 1893. Serial No. 459,512. (No model.)

*To all whom it may concern:*

Be it known that I, PHILIP H. DENCER, of Sprague, in the county of Lincoln and State of Washington, have invented a new and useful Improvement in Hose-Couplings, of which the following is a specification.

My invention is in the nature of an improved hose coupling for fire and other hose which is designed to provide a coupling which may be more quickly and conveniently united and one that will not leak.

To these ends the invention consists in the peculiar construction and arrangement of the parts which I will now proceed to describe with reference to the drawings in which—

Figure 1 is a longitudinal central section through the coupling showing by the arrows the direction the water is to flow. Figs. 2 and 3 are face views of the two adjoining faces of the coupling, and Fig. 4 is a detail plan view of the ratchet lever for securing the two parts of the coupling.

K K represent the two adjacent ends of a hose which are shown connected by my coupling.

A and B are the two ring-shaped sections of the coupling applied by any suitable water tight connection to the adjacent ends of the hose K. The inner periphery of the section A is slightly prolonged to form a lip or flange E made tapering on its outer edge with an inward or concave curve, and is adapted to enter a corresponding recess S in the opposite section to make a tight wedging joint. On the lower edge of the section A is formed a fulcrum lug M with an opening through it to receive the curved lip H on the other section, which two parts form a hinging point about which the two sections of the coupling open or shut in connecting or disconnecting the coupling.

In the face of the section A there is formed a circular groove G, and in the face of the section B there is another circular groove F of a somewhat larger diameter. These grooves are intended to receive gum gaskets or packing rings $r$, which, when the coupling sections are brought together, close the joint at two points with an elastic and perfectly water tight bearing.

To lock the two sections of the coupling together I provide a locking lever C. This is a short lever having an elbow $C^2$ at right angles to the main part. This lever is fulcrumed upon a pin D held in lugs $B'$ $B'$ formed on the coupling section B, and the elbow $C^2$ of the lever enters a recess in the coupling A and locks the two sections of the coupling together by pressing against the lip $C^3$ whereby the lever is turned parallel to the line of hose. At the opposite end of the recess entered by elbow $C^2$ there is an overhanging lip $C^4$ and the lever is locked down in the closed position by a sliding catch $C^5$ whose head passes under the lip $C^4$. This catch is carried in a sliding frame $C^6$ Fig. 4 moving in a slot in the lever which frame is forced toward the outer end of the lever by a spiral spring $C^7$ interposed between the said frame $C^6$ and the metal of the lever. This frame is provided with laterally projecting lugs or ears $C^8$ by which it is slid back to unlock the catch.

Having thus described my invention, what I claim as new, and desire to secure by Letters Patent, is—

1. A hose coupling consisting of the two ring-shaped sections having upon one side a loose hinge joint, and upon the other side means for drawing together and locking the two sections, consisting of a lip or shoulder $C^3$ on one section, and a lever C hinged to the other section and provided with an elbow $C^2$ adapted to bear against said lip or shoulder, to draw the sections together and means for locking the lever in its closed position substantially as shown and described.

2. The combination of the coupling section A having recess with lip or shoulder $C^3$ and overhanging lip $C^4$, and the coupling section B having hinged to it a lever C with elbow $C^2$, and the slide $C^6$ with lugs $C^8$ catch $C^5$ and spring $C^7$, substantially as shown and described.

PHILIP H. DENCER.

Witnesses:
T. M. COOPER,
E. A. COOPER.